March 20, 1934. D. T. ROSS 1,951,629
PRESSURE AND TEMPERATURE RECORDING DEVICE FOR WELLS
Filed April 26, 1930 2 Sheets-Sheet 1

Inventor:
Dewey T. Ross,
by Rippey & Kingsland.
His Attorneys.

March 20, 1934.　　　D. T. ROSS　　　1,951,629
PRESSURE AND TEMPERATURE RECORDING DEVICE FOR WELLS
Filed April 26, 1930　　2 Sheets-Sheet 2
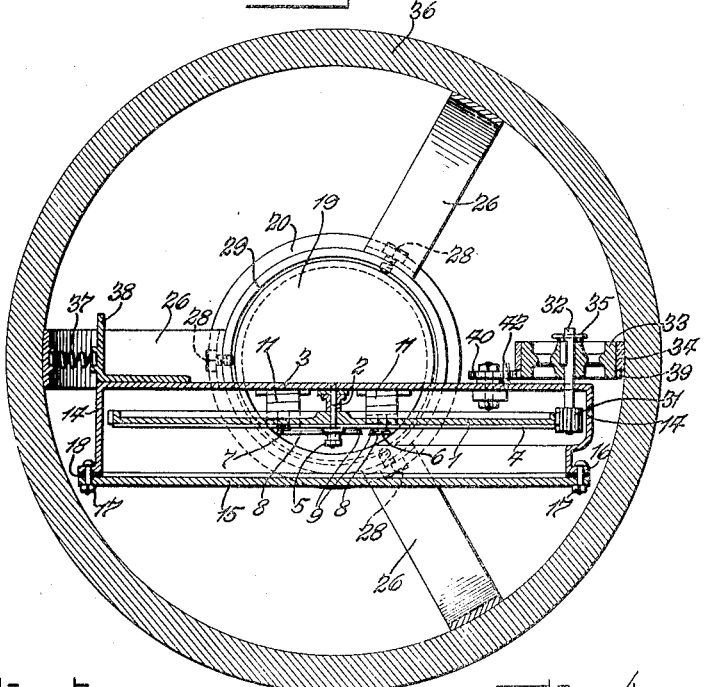
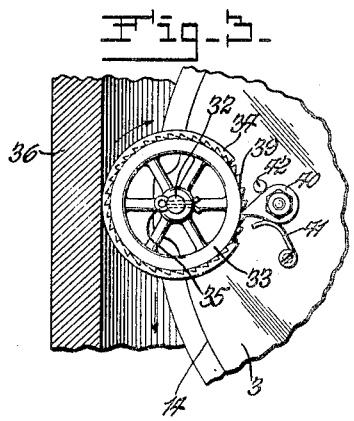
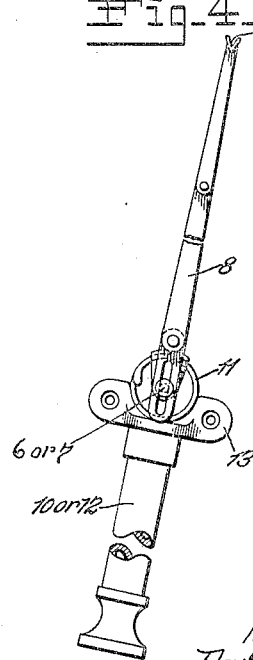

Patented Mar. 20, 1934

1,951,629

UNITED STATES PATENT OFFICE 1,951,629

PRESSURE AND TEMPERATURE RECORDING DEVICE FOR WELLS

Dewey T. Ross, Dallas, Tex., assignor to Shell Petroleum Corporation, a corporation of Virginia Application April 26, 1930, Serial No. 447,449

7 Claims. (Cl. 234—6)

This invention relates to a device for recording the temperatures and pressures in wells.

One of the objects of the invention is to provide a device which will with convenience record the temperatures and pressures at different points in a well.

Other objects will appear from the detail description taken in connection with the accompanying drawings, in which:—

Fig. 2 is a cross-section.

Fig. 3 is a detail rear elevation showing the actuating wheel and ratchet.

Fig. 4 is a detail elevation of a recording instrument.

Figure 1:
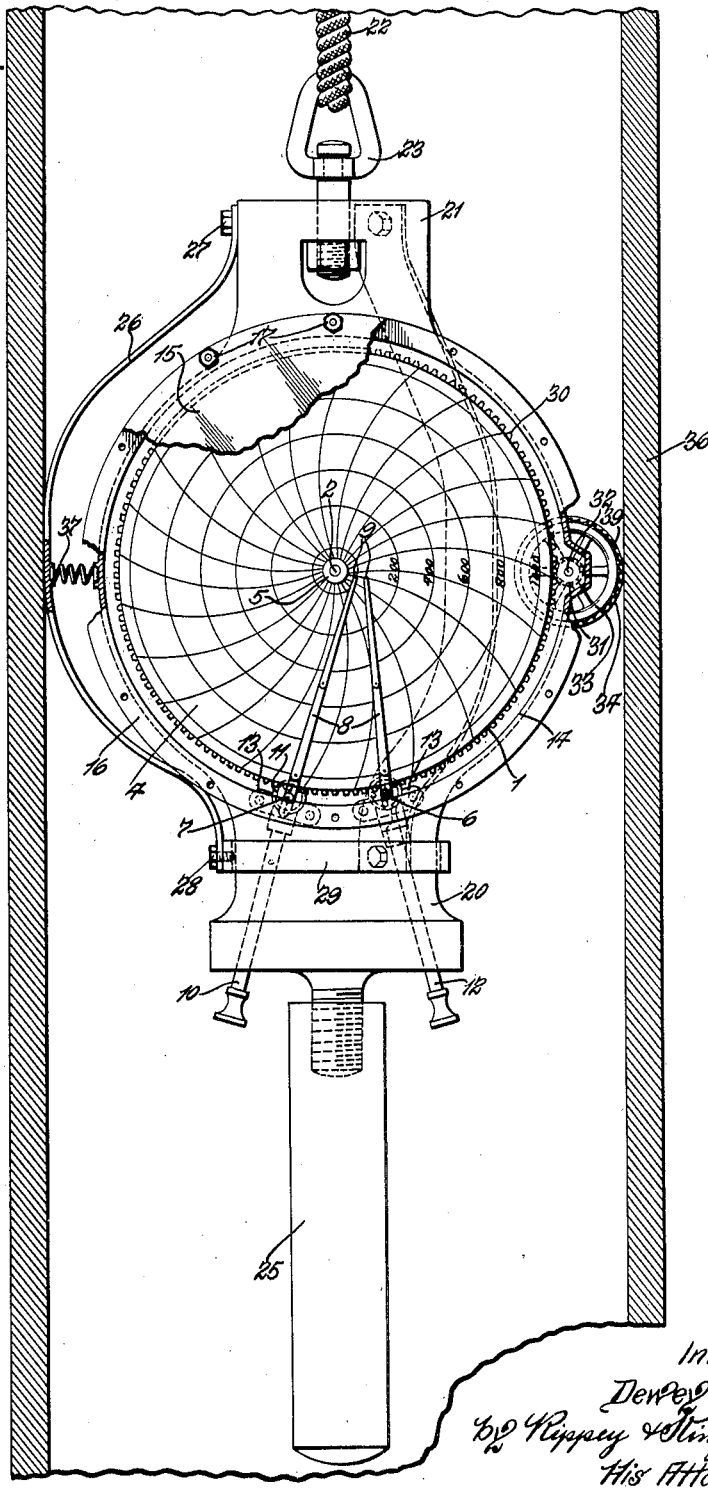
Fig. 1 is an elevation partly in section.

The recording mechanism includes a rotatable disk 1 mounted for rotation about the pin 2, which is secured to a rear wall 3 of a closed chamber. A chart 4 having suitable lines and legends is secured for rotation on the disk 1 by a thumb nut 5. Instruments 6 and 7 for recording the temperature and pressure respectively, have arms 8, each carrying a pen 9 to record upon the chart 4. The recording instruments are substantially alike in design and are illustrated in Fig. 4. The pressure instrument 7 has a tube 10 open to and in communication with the fluid whose pressure is to be indicated and in communication with a helical pressure element 11, which comprises a coiled metal tube closed at one end. The pen arm 8 is fastened directly to the end of the element 11. This helical pressure element 11, being in communication with the outside pressure, has a tendency to uncoil under pressure and thus the pen arm is actuated. The temperature recording instrument 6 is similar in structure to the pressure recording instrument, except that the tube 12, which corresponds to tube 10 of the pressure instrument, is closed at its upper end and contains a body of gas, such as nitrogen, which expands and contracts under temperature changes, and thus through its element 11 moves the pen arm 8 in precisely the same manner as the pen arm 8 of the pressure instrument is moved. The instruments 6 and 7 are secured to the rear wall 3 of the chamber by means of the flanges 13. That part of the device already described is well known. The recording instruments in particular are in extended use, are well known, and do not require extended detailed description.

In accordance with this invention, the disk 1 and the moving parts of the instruments 6 and 7 are enclosed within a sealed chamber comprising the rear wall 3, side wall 14 and a front wall 15. The side wall 14 has a flange 16, to which the front wall 15 is secured by the bolts 17. A gasket 18 is inserted between the wall 15 and the flange 16 to secure a seal.

The chamber is secured to a frame 19 having a lower section 20 and an upper section 21. The upper section 21 is connected to a cable 22 through a swivel 23, and the lower section 20 has external threads for engagement with internal threads on a weight 25.

A series of shoes 26, comprising leaf springs, are secured at their upper end by screws 27 to the top frame section 21, and at their lower end by screws 28 to a collar 29 situated about the lower section 20.

The disk 1 has in its periphery a gear 30 for cooperation with a pinion 31 secured to a shaft 32 passing through the rear wall 3 of the chamber. A wheel 33 having a tire 34 of suitable composition such as rubber, is keyed to the shaft 32 and secured thereon by a cotter 35. The situation of the wheel 34 and the arrangement of the shoes 26 is such that when the device is lowered into a well casing 36, the shoe 26 opposite said wheel will hold the wheel against the casing. A coil spring 37 may be interposed between a bracket 38, secured to the rear wall 3 of the chamber, and the inner surface of this shoe, for the purpose of more effectively performing the function.

The wheel 33 has in its periphery a series of ratchet teeth 39 adapted to cooperate with a pawl 40 normally held in position by the spring 41 and the stop 42. The arrangement of the teeth 39 and the pawl 40 is such as to prevent reverse rotation of the wheel 33 and, therefore, of the disk 1.

In the operation of the device, the chart 4 is placed in proper position on the disk 1, the chamber is sealed by securing the front wall 15 to the flange 16 with the gasket 18 interposed, the swivel 23 is attached to a cable 22, and the device is lowered into the well, the weight 25 assisting in lowering the device. As it is lowered the wheel 33 is in engagement with the casing 36, and through the shaft and gear connection turns the disk 1 and its attached chart, corresponding to the downward travel. The temperature and pressure at each point in the well is indicated by continuous lines marked on the chart by the pens 9 on the instruments 6 and 7. It is, of course, necessary to lower the device at such a speed as will enable the temperature in the well to be communicated to the enclosed gas in the tube 12 of the temperature instrument 6. After the bottom of the well has been reached and the recordings completed, reverse rotation of the disk 1 will be prevented by the ratchet teeth 39 being in engagement with the pawl 40.

It will thus be seen that a device has been constructed which may conveniently be used to record the pressures and temperatures in a well. The device is simple in construction and easy of manipulation.

It is obvious that such a device may include singly either an instrument for measuring the temperature or an instrument for measuring the pressure, although it is desirable in most cases to use a device including both instruments, since both measurements may be desired and both recordings can be taken simultaneously.

I claim:

1. In a recording device for wells including a chamber having a movable chart and an instrument adapted to record on the chart, the combination of a wheel exterior of the chamber and adapted to engage the casing of the well, and means connected to the wheel for imparting movement to the chart.

2. In a recording device for wells including a chamber containing a movable chart and an instrument adapted to record on the chart, the combination of a wheel exterior of the chamber adapted to engage the casing of the well, means connected to the wheel for imparting movement to the chart, and means to prevent reverse movement of the chart.

3. In a recording device for wells including a chamber containing a movable chart and an instrument adapted to record on the chart, the combination of a wheel exterior of the chamber adapted to engage the casing of the wheel and impart movement to the chart, and means for engagement with the casing of the well to press the wheel firmly against the casing.

4. In a recording for wells including a chamber containing a movable chart and an instrument adapted to record on the chart, the combination of a wheel exterior of the chamber, means connected to the wheel for imparting movement to the chart, and a resilient shoe for engagement with the casing of the well to press the wheel firmly against the casing.

5. In a recording device for wells including a chamber containing a movable chart and an instrument adapted to record on the chart, the combination of a wheel exterior of the chamber, means connected to the wheel for imparting movement to the chart, a series of resilient strips for engagement with the casing, a bracket on the chamber opposite the wheel, and a spring interposed between the bracket and a shoe adapted to press the wheel firmly against the casing of the well.

6. In a recording device for wells including a chamber, a rotatable disc in the chamber and an instrument adapted to record on the disc, the combination of gear teeth arranged circumferentially on the disc, a pinion for engagement with said teeth and mounted on a shaft passing through a wall of the chamber, and a wheel secured to the shaft exterior of the chamber and adapted to engage the casing of the well.

7. In a recording device for wells including a frame, a chamber attached to the frame, means at the top of the frame for engagement with a cable, a weight at the lower end of the frame, a movable chart within the chamber and an instrument adapted to record on the chart, the combination of a wheel exterior of the chamber adapted to engage the casing of the well, means connected to the wheel for imparting movement to the chart, and a series of resilient strips for engaging the interior of the well casing, secured at their one end to the top of the frame and at their lower end to the bottom of the frame, arranged to center the device and adapted to press the wheel firmly against the casing.

DEWEY T. ROSS.